(12) United States Patent (10) Patent No.: US 8,462,909 B2
Yamasaki et al. (45) Date of Patent: Jun. 11, 2013

(54) DOPPLER REACTIVITY COEFFICIENT MEASURING METHOD

(75) Inventors: Masatoshi Yamasaki, Osaka (JP); Yasushi Hanayama, Osaka (JP); Yasunori Ohoka, Osaka (JP); Masashi Tsuji, Osaka (JP); Yoichiro Shimazu, Osaka (JP)

(73) Assignee: Nuclear Fuel Industries, Limited, Tokyo (JP)

( * ) Notice: Subject to any disclaimer, the term of this patent is extended or adjusted under 35 U.S.C. 154(b) by 438 days.

(21) Appl. No.: 12/694,729

(22) Filed: Jan. 27, 2010

(65) Prior Publication Data

US 2010/0128832 A1 May 27, 2010

Related U.S. Application Data

(63) Continuation of application No. PCT/JP2008/063557, filed on Jul. 29, 2008.

(30) Foreign Application Priority Data

Jul. 30, 2007 (JP) ................................ 2007-197130

(51) Int. Cl.
 *G21C 17/00* (2006.01)
(52) U.S. Cl.
 USPC .......................................... 376/245; 376/254
(58) Field of Classification Search
 USPC ................................................. 376/245, 254
 See application file for complete search history.

(56) References Cited

U.S. PATENT DOCUMENTS 3,916,444 A * 10/1975 Alliston et al. ............... 376/217

FOREIGN PATENT DOCUMENTS

| JP | 9-105796 A | 4/1997 |
|---|---|---|
| JP | 2006-84181 A | 3/2006 |
| JP | 2006-105814 A | 4/2006 |

OTHER PUBLICATIONS

Tsuji et al., "Estimating Temperature Reactivity Coefficients by Experimental Procedures Combined with Isothermal Temperature Coefficient Measurements and Dynamic Identification", Journal of Nuclear Science and Technology, May 2006, pp. 576-586, vol. 43, No. 5.

* cited by examiner

*Primary Examiner* — Timothy A Brainard
(74) *Attorney, Agent, or Firm* — Birch, Stewart, Kolasch & Birch, LLP

(57) ABSTRACT

The output of a nuclear reactor is increased by a predetermined magnitude, and the neutron beam is measured as time-series data. The temperature of the moderator in the reactor is acquired as time-series data. Time-series data on the reactivity is acquired from the time-series data on the neutron beam by the reverse dynamic characteristic method with respect to a one-point reactor kinetics equation. Time-series data on the fuel temperature of a predetermined average acquired by using the time-series data on the reactor output and a predetermined dynamic characteristic model is acquired. The reactivity feedback contribution component is determined by using the time-series data on the reactivity and the applied reactivity. The Doppler reactivity coefficient is determined by using the time-series data on the average temperature of the moderator in the reactor, the time-series data on the fuel temperature of the predetermined average, the isothermal temperature reactivity coefficient, and the reactivity feedback contribution component.

8 Claims, 7 Drawing Sheets

DOPPLER REACTIVITY COEFFICIENT MEASURING METHOD

This application is a Continuation of copending PCT International Application No. PCT/JP2008/063557 filed on Jul. 29, 2008, which designated the United States, and on which priority is claimed under 35 U.S.C. §120. This application also claims priority under 35 U.S.C. §119(a) on Patent Application No. 2007-197130 filed in Japan on Jul. 30, 2007, all of which are hereby expressly incorporated by reference into the present application.

TECHNICAL FIELD

The present invention relates to a Doppler reactivity coefficient measuring method and, more specifically, to a Doppler reactivity coefficient measuring method for directly measuring Doppler reactivity coefficient utilizing nuclear reactor physics test data.

BACKGROUND ART

In a commercial nuclear power plant, for example, in a pressurized water reactor (hereinafter referred to as "PWR" in principle), in order to ensure safe and cost-efficient operation, reactor core design is carried out before each cycle of operation to consider various matters such as how to arrange fuel assemblies each having different burn-up and hence different reactivity in the reactor core and whether or not self-regulating characteristics of the reactor core are sufficient.

During periodic inspections between each cycle, nuclear reactor physics tests (start-up reactor physics tests) are performed to measure and evaluate reactor physics characteristics of the reactor core for the current cycle operation. For example, during the tests, whether or not the designed reactor core achieves critical through prescribed operations is determined, and reactivity variation when control rods are moved with respect to the reactor core and reactivity variation when moderator temperature is changed are measured, to confirm the validity of the reactor core design.

Here, the self-regulating characteristics refer to characteristics that when reactivity of the reactor core varies by some cause or other and s as a result, a phenomenon acting in the reverse direction naturally occurs in the reactor, that is, so-called negative reactivity feedback, which is a very important factor ensuring safe operation of a nuclear reactor. In a PWR, fuel temperature reactivity coefficient, that is, reactivity variation of the nuclear reactor caused by fuel temperature variation, and moderator temperature reactivity coefficient, that is, reactivity variation of the nuclear reactor derived from moderator temperature variation, are both negative (if the temperature rises, negative reactivity is added), and thus the PWR exhibits the self-regulating characteristics. In a boiling water reactor (hereinafter referred to as "BWR" in principle), the self-regulating characteristics are exhibited additionally by the phenomenon (effect) that the number of neutrons slowed down by cooling water decreases, as the bubbles in the cooling water increases when temperature rises.

The fuel temperature reactivity coefficient mentioned above is governed by a phenomenon called Doppler effect. Doppler effect refers to a phenomenon that if temperature rises, nuclide existing in the fuel increases resonance absorption of neutrons, so that the number of neutrons contributing to nuclear fission decreases and, as a result, core reactivity lowers. The ratio of the reactivity variation to unit temperature change is referred to as Doppler reactivity coefficient. In U238 that occupies a great part of uranium fuel used in existing light water reactors, the effect is significant since U238 exhibits strong resonance absorption of neutrons. This effect realizes the function of decreasing reactor power if the temperature of nuclear fuel increases. In addition, this effect realizes rapid time response, since it reflects temperature variation of fuel more directly in a short period after reactor power variation rather than that of the moderator. Hence, in a PWR, this effect is believed to play a key role in realizing safe operation, since PWR lacks the effect attained by the increase of bubbles in cooling water, which is attained in a BWR The relation between the fuel temperature variation and the reactivity in a commercial nuclear power plant is evaluated by using, temperature dependent nuclear reactor cross section data obtained by measurements of relation between the nuclear fuel temperature variation and nuclear reaction such as neutron absorption. It is noted, however, that in the nuclear reactor physics tests, the fuel temperature reactivity coefficient is not directly measured, since it is difficult to directly measure the fuel temperature and if fuel temperature is changed, other parameters including the moderator temperature would also be changed. Conventionally Doppler reactivity coefficient is evaluated by neutronics characteristics analysis at the time of nuclear core design.

As long as the conventional fuel are used, Doppler reactivity coefficient can be evaluated with high accuracy based on knowledge and experiences accumulated for a long history (paragraphs 0003 and 0004 of Patent Document 1).

In order to realize safe operation of nuclear reactor with higher reliability, it is preferred to directly measure Doppler reactivity coefficient, as part of the verification of core design. It is more important particularly for PWRs, in which full-scale utilization of MOX fuel and high burn-up fuel within a few years is planned.

In countries outside Japan, direct measurements of the relation between fuel temperature variation and reactivity variation, that is, fuel temperature reactivity coefficient, were made several times in 1950s in research reactors. In such measurements, temperature of small spheres made of metal uranium or uranium oxide was increased under soft neutron spectrum conditions with few fast neutrons, and reactivity variation was measured (Non-Patent Documents 1 and 2).

In Japan, using FCA (Fast Critical Assembly: very small nuclear reactor) of Japan Atomic Energy Agency, in 2005, only the uranium oxide fuel or MOX fuel was loaded in soft neutron spectrum field, temperature was increased and reactivity variation was measured (Non-Patent Document 3).

The data obtained by the above-described measurements using actual reactors and the like are important for expanding database and for verifying general-purpose nuclear design codes. However, the nuclear reactors used for the actual measurements are very small and much different in shape and structure from commercial nuclear power plants. Therefore, the validity of core design and the verification of code design codes directed to large scale commercial nuclear power plants that require higher accuracy are attained not directly but indirectly.

For this reason, technology that enables direct measurement of Doppler reactivity coefficient particularly of a PWR has been long desired. Tsuji, one of the inventors of the present invention, at last developed the method recently (Patent Document 1).

According to this method, basically, isothermal temperature reactivity coefficient measurement method and dynamic identification are combined for measuring fuel temperature reactivity coefficient. Generally, the method includes the steps (process steps) described below.

Here, "isothermal temperature reactivity coefficient" refers to the sum of reactivity coefficient related to fuel temperature only (obtained by partial differentiation by fuel temperature) and reactivity coefficient related to moderator temperature only (obtained by partial differentiation by moderator temperature).

In the isothermal temperature reactivity coefficient measurement, moderator temperature is slowly increased or decreased without fission energy while the nuclear reactor is in critical but substantially zero power state. In this experiment, fuel temperature follows quasi-statically or isothermally moderator temperature (this means that fuel temperature is nearly equal to moderator temperature), because the fission energy is negligible and the changing rate of moderator temperature is very slow. As the temperatures change, the reactivity also changes.

First, form the measurement mentioned above, the isothermal temperature reactivity coefficient is obtained as the ratio of reactivity variation to moderator temperature variation.

Next, control rods are withdrawn to add external reactivity, whereby reactor power is increased, for example, by about 1% of the rated power.

At this time, time changes of added external reactivity, ex-core neutron detector response, inlet coolant (moderator) temperature and average coolant (moderator) temperature are measured and time-series data of them are collected.

Further the ex-core neutron detector response is input to a digital reactivity meter, to obtain transient of nuclear reactor reactivity.

From the resulting time-series data, fuel temperature reactivity coefficient is calculated using dynamic identification.

Specifically, the measured time series data are converted into frequency response expressions by numerical Fourier Transform to apply a dynamic identification method in a frequency domain. Doppler reactivity coefficient is determined so as to reproduce the frequency responses of measured data in the frequency transfer response of the reactor kinetics model through the least square fitting (basically, by the least square method).

It is note that moderator temperature reactivity coefficient can be calculated by subtracting Doppler reactivity coefficient from isothermal temperature reactivity coefficient.

Dynamics Identification in a frequency domain refers to a method of estimating a frequency transfer function $G(\omega)$ that establishes a frequency response relation between the input and output frequency responses, $u(\omega)$ and $x(\omega)$ at the frequency $\omega$ that are converted from time series data $u(t)$ and $x(t)$ by numerical Fourier Transform, and thereby finding $g(t)$ (solving the function equation), when a known function $u(t)$ is input to a fully or partially unknown function $g(t)$ and an output function $x(t)$ is known, Patent Document 1: JP2006-84181A
Non-Patent Document 1: E. Creutz, et al., "Effect of Temperature on Total Resonance Absorption of Neutrons by Spheres of Uranium Oxide," J. Apple. Phys. 26, 276 (1955)
Non-Patent Document 2: R. M. Pearce et al., "A Direct Measurement Uranium Metal Temperature Coefficient of Reactivity," Nucl. Sci. Eng., 2, 24 (1957)
Non-Patent Document 3: JAERI-Research, 2005-026 issued by Japan Atomic Energy Agency

DISCLOSURE OF THE INVENTION

Problems to be Solved by the Invention

The above-described method of directly measuring Doppler reactivity coefficient requires numerical Fourier transform, that is, transform to frequency data and, therefore, application to discontinuous data (i.e. data with some intermittent time intervals where measured data are unavailable for measuring Doppler reactivity coefficient) is difficult. As a result, when there is frequent range switching of NIS (Neutron Instrumentation system: ex-core neutron detector) or movement of control rod bank, which causes noise mixture and significant fluctuation in measurement values, application of this method becomes very difficult.

Therefore, a method of measuring Doppler reactivity coefficient of a nuclear reactor, which enables easy measurement and is applicable to discontinuous data, has been desired.

Means for Solving the Problems

The present invention was made in order to solve the above-described problems, and, according to the invention, initial reactivity $\rho_{in}$ is applied from a subcritical but very close to critical state, thereafter reactor power is increased with a constant reactor period at the beginning and the increasing rate gradually reduces due to temperature reactivity feedback. The contribution of reactivity feedback is read from variation in reactivity $\rho_p$ corresponding to the constant reactor period (reactivity of constant reactor period, that is, reactivity added as the power increased at a constant rate in a logarithm scale, when reactor core achieves from sub-critical to super critical). The reactor power is increased until reactivity compensation effect induced by temperature reactivity feedback becomes noticeably large and then is decreased by inserting control rod bank "Reactor period" refers to a time period in which the power of nuclear reactor attains to e (about 2.718) times higher.

Here, the following points are taken into consideration.

As a reactor initial condition before the measurement is started, a sub-critical but very close to critical state at a final process step approaching to the criticality is used. In this condition, all the control rod banks except one bank are fully withdrawn, the boron concentration of moderator (coolant) is diluted close to the critical boron concentration, and the criticality is attained if partially inserted control rod bank is withdrawn with few steps (for example, in Westinghouse type PWRs, total movable steps of control rod is 228).

Further, as the means for reading contribution of reactivity feedback, the values $\rho_{in}$ and $\rho_p$ are subjected to simulation analysis in a low power range that yields little feedback, and values that reproduce actually measured NIS signals are searched and determined.

Specific process procedure for the measurement includes six steps of: collecting data; removing γ-ray influence from collected neutron flux data; extracting reactivity feedback contribution component; determining upper limit attained reactor power; calculating average fuel rod temperature; and estimating Doppler reactivity coefficient. In the following, contents of each step will be described in detail, using mathematical expressions.

[Preconditions]

As preconditions for the measurement, it is assumed that values detected by ex-core neutron detector of the power range, average cooling water temperature of the nuclear reactor as the object are measurable as time-series data, and data necessary for core analysis are all available. Therefore, for example, one-point reactor kinetic parameters βi and λi (where i represents six-group delayed neutrons; i=1, . . . 6), importance power-averaged correction factor {factor used for converting volume-averaged value of fuel rod calculated by one-point reactor kinetic model to average temperature weighted by neutron flux distribution and adjoint neutron flux (neutron importance) distribution} of fuel rod temperature, control rod bank operation history are fairly accurately known or approximately known from separate theoretical analysis or from operation records. Further, from the isothermal temperature coefficient measurement test performed prior to the present measurement, isothermal temperature reactivity coefficient (=Doppler reactivity coefficient+moderator temperature reactivity coefficient) is also known.

In addition to the above, various coefficients including Doppler reactivity coefficient of fuel as the object of measurement, initial sub-criticality and the like are approximately known from theoretical analysis at the time of design and from past experiences. Therefore, when an error function is evaluated in a dynamic identification method, these approximate values are often input as initial values, or close values thereof are often input.

[Step of Collecting Data]

From a nuclear reactor (PWR) in a sub-critical state, control rods are withdrawn by a prescribed amount to attain super critical and low power state, and series of variations in the neutron flux and average moderator temperature are continuously collected as time-series data. Here, sub-criticality $\rho_{sub}$ can be back-calculated from the reactivity $\rho_{in}$ applied as the control rods are withdrawn by a prescribed amount, and from reactivity $\rho_p$ of constant reactor period.

A commercial reactor provides some level of neutron numbers even in sub-critical state due to neutrons emitted by external neutron sources and from spent fuels.

Further, the critical state refers to a state of equilibrium in which the number of neutrons released by fission in the reactor is equal to the number of neutrons lost by absorption in the reactor and leaving to the outside of the reactor (effective multiplication factor is 1), and the (thermal) output in the reactor is determined depending on the level of neutron numbers where the state of equilibrium is attained.

(Removal of γ-Ray from Neutron Flux Data)

As described above, when variations of neutron flux in a nuclear reactor of which power is extremely low as compared with the rated power and hence neutron flux is small are to be collected as time-series data, some correction procedure is required. Specifically, γ-rays are emitted from activated structure materials around detectors. Ex-core neutron detectors used in the zero power reactor physics test are uncompensated ionization chambers equipped as a power range monitor in NIS (Nuclear Instrumentation System) and react to γ-rays. There is always a constant dose of γ-ray derived from the spent nuclear fuel even at the time of zero-power test. On the other hand, the neutron flux in the reactor during the zero-power test is at a low level, since the reactor power is low. As a result, at the time of zero-power test, the background component contained in collected data or the noise caused by γ-ray is not negligible. After the reactor power increases substantially, the number of neutrons generated in the reactor increases and, therefore, the influence of γ-ray becomes small enough to be negligible.

Therefore, in the zero-power test, the influence of γ-ray, that is, the component (noise) caused by γ-ray erroneously collected as neutrons, is removed from the data of NIS signal obtained by using an ionization chamber, utilizing the characteristic that the component resulting from γ-ray is almost constant regardless the reactor power. It is noted that when a PWR to be constructed in the future is devised to enable direct measurement of neutrons free from the influence of γ-ray, this operation would be unnecessary.

The specific method is as follows. First, neutron flux that corresponds to the reactor power is converted and obtained as the current data. Thereafter, based on the obtained data, an error function $E(g_c, \rho_p)$ representing an error between the value numerically evaluated by digital simulation of low reactor power transient and the actually measured value is defined by Equation (1) below. Then, γ-ray mixture rate (the ratio of mixed noise component to the genuine neutron signal corresponding to the initial reactor power) $g_c$ is plotted on the X-axis, reactivity of constant reactor period $\rho_p$ is plotted on the Y-axis, and the error function $E(g_c, \rho_p)$ is plotted on the Z-axis. Further, using $g_c$ and $\rho_p$ as parameters, a combination of points $g_c$ and $\rho_p$ that minimizes the value $E(g_e, \rho_p)$ is found (such an operation of finding parameter values of which error function attains the minimum basically based on the least squares method is also referred to as "fitting"). The value $g_c$ found in this manner serves as the actual γ-ray mixture rate.

Here, the error function is given as a logarithm (ln), considering that the reactor power increases exponentially with time.

$$E(g_c, \rho_P) = \frac{1}{N} \sum_{i=1}^{N} \left\{ \ln\left(\frac{P^s(t_i) + g_c P_0^s}{P_0^s + g_c P_0^s}\right) - \ln\left(\frac{P^m(t_i)}{P_0^m}\right) \right\}^2 \quad \text{[Equation 1]}$$

In the equation above, P represents reactor power, upper suffixes s and m represent an analytical value and a measured value, respectively, t represents time, N represents the number of data, $t_i$ represents time corresponding to data i, 0 represents an initial value (t=0), and the core is sub-critical. As the measured value of reactor power, the NIS signal is used, assuming that the NIS signal is in proportion to the reactor power.

Since the reactor power response necessary for the analysis above is in the low power range in which contribution to reactivity feedback is negligible and since only the relative variation reactor power response with respect to the initial power is required, the initial reactor power $P^s_0$ may be set arbitrarily as long as these conditions are satisfied. Absolute value response of reactor power is determined by a processing method that will be described later.

The output data with the γ-ray removed, reconfigured from the actually measured NIS signal, is given by Equation (2) below:

$$P_g^m(t) = \left(\frac{P_0^s + g_c P_0^s}{P_0^m}\right) P^m(t) - g_c P_0^s \quad \text{[Equation 2]}$$

Accordingly, the width of reactor power variation $R_{zm}$ can be calculated in accordance with Equation (3) below, from the initial power $P^m_g(0)$ and from the maximum reactor power Pmg,max[max{Pmg(t)}], that is attained at the time just before control rod bank is inserted to reduce reactor power after a large temperature reactivity feedback effect is observed in reactivity transient (hereinafter the maximum power is referred to as "upper limit reactor power").

A commercial power reactor provides some level of neutron numbers even in the sub-critical state as described above and, therefore, the denominator of Equation (3) is not zero.

$$R_{zm} = \frac{P_{g,max}^m}{P_g^m(0)} \quad \text{[Equation 3]}$$

With the reactivity of constant reactor period $\rho_p$ the initial sub-criticality $\rho^0_{sub}$ can be obtained from Equation (4).

$$\rho_{sub}^0 = \rho_{in} - \rho_P \quad \text{[Equation 4]}$$

In each iteration process in the least square fitting for determining gc and $\rho_p$, the strength of external neutron source term in the one-point reactor kinetics equation is reevaluated using a modified value of $\rho_p$ as $-\rho^0_{sub} P^s_0/\Lambda$ where $\Lambda$ is the neutron generation time.

Here, the applied initial reactivity $\rho_{in}$ from positions control rods before and after movement can be estimated from control rod bank reactivity worth that is measured experimentally in a routine test of the zero power reactor physics test or evaluated numerically with reactor design codes.

(Extraction of Reactivity Feedback Contribution Component)

From the time-series data of reactor power with γ-ray removed, time-series data of reactivity $\rho$ is calculated by inverse kinetic method with respect to one-point reactor kinetic equation. The reactivity feedback contribution component $\Delta\rho_{fd}$ is obtained by subtracting $\rho_{in}$ from reactivity variation $\rho(t)$ as represented by Equation (5).

$$\Delta\rho_{fd}(t) = \rho(t) - \rho_{in} \quad \text{[Equation 5]}$$

On the other hand, the reactivity feedback contribution component $\Delta\rho_{fd}$ is a sum of contributions of Doppler reactivity feedback coefficient $\alpha_f$ and moderator temperature reactivity feedback, and represented by Equation (6) below:

$$\Delta\rho_{fd}(t) = \alpha_f(\beta T_{f,av}(t) - \Delta T_{c,av}(t)) + \alpha_{itc}\Delta T_{c,av}(t) \quad \text{[Equation 6]}$$

Here $\alpha_f$ and $\alpha_{itc}$ represent Doppler reactivity coefficient and isothermal temperature reactivity coefficient, $\Delta T_{f,av}$ represents change amount of average fuel rod temperature, and $\Delta T_{c,av}$ represents change amount of average moderator temperature.

The reactivity contribution component $\Delta\rho_{fc}$ {component of the first term on the right side of Equation (6)} related to Doppler reactivity coefficient $\alpha_f$ can be represented by Equation (7) below. This component is calculated form measured overall temperature reactivity feedback contribution $\Delta\rho_{fd}$ obtained from Equation (5), measured change amount $\Delta T_{c,av}$ of average moderator temperature and measured isothermal temperature reactivity coefficient $\alpha_{itc}$.

$$\Delta\rho_{fc}(t) = \Delta\rho_{fd}(t) - \alpha_{itc}\Delta T_{c,av}(t) \quad \text{[Equation 7]}$$

On the other hand, $\Delta\rho_{fc}$ has the relation of Equation (8) with the average fuel rod temperature and, therefore, if the average fuel rod temperature can be evaluated, Doppler coefficient $\alpha_f$ can be estimated.

$$\Delta\rho_{fc}(t) = \alpha_f(\Delta T_{f,av}(t) - \Delta T_{c,av}(t)) \quad \text{[Equation 8]}$$

If the actual reactor variation is known, the change of average fuel rod temperature $\Delta T_{f,av}(t)$ can be numerically evaluated from fuel rod heat conduction equation, using actually measured average moderator temperature $T_{c,av}(t)$. Specifically, in a general PWR, sensors for measuring coolant (moderator) temperature are installed in coolant pipes near the inlet and outlet, respectively, of the reactor core, and the values measured by these sensors are output through an averaging circuit as coolant (moderator) temperature.

From the signal obtained by removing γ-ray from the NIS signal, it is possible to determine the ratio $R_{zm}$ of the upper limit reactor power to the initial power, while it is impossible to determine the absolute value of the power. Here, if the core inlet moderator temperature is constant or if it is measured, the reactor power can be obtained by evaluating the difference between the core inlet and outlet temperatures from actually measured average moderator temperature $T_{c,av}$. When reactor power changes, however, the balance between heat supply from the reactor core and heat removal on the secondary side of cooling loop steam generator is temporarily lost, of which influence appears as a variation in core inlet temperature. Thus, assumption of constant core inlet temperature is not applicable.

As mentioned before, temperature sensors are installed in coolant pipes near the inlet and outlet of the reactor core to measure the average moderator temperature. Therefore if the signal line of the inlet temperature sensor is connected to a data acquisition system, the time-series data of inlet moderator temperature are available and the reactor power can be determined from the measured inlet and average moderator temperatures. However this requires a change of normal procedure of the zero power reactor physics test. As a general trend electric power companies are reluctant to change established routine test procedure from possibility that if might cause unexpected troubles in the startup period.

In the present invention, based on the reasons mentioned above, a method for measuring Doppler reactivity coefficient with standard measurement devices in conventional testing processes of zero power reactor physics test is proposal.

In the case where the time series data of inlet moderator temperature are available, the process for determine the actual reactor power that will be explained below can be skipped.

In order to measure Doppler reactivity coefficient by a conventional measuring system, heat removal model in a primary coolant loop of PWR such as shown in FIG. 1 is incorporated in a nuclear reactor kinetic simulation model, whereby the absolute value of reactor power change is obtained.

(Primary Cooling Loop Heat Removal Model)

Referring to FIG. 1, reference character 10 denotes a reactor core, 20 a steam generator, 30 a cooling water circulation pump, 41 a reactor outlet side pipe, 42 a reactor inlet side pipe, arrows represent moderator (cooling water) flow and thick white arrows represent heat flow.

The simulation model simulating the heat removing behavior of primary coolant loop is configured from heat transport equation and energy conservation equation on average coolant temperatures of reactor inlet and outlet pipes, average coolant temperature on the primary side of steam generator and average coolant temperature of cooling pump compartment.

(Determination of Upper Limit Reactor Power)

The most important parameter determining the cooling characteristics of primary coolant loop is a time constant $\tau_{sg,12}$ related to heat transfer from the primary side to the secondary side of steam generator, which must be determined.

Different from a small nuclear reactor such as a materials test reactor or a critical test facility, a large scale nuclear reactor for power generation, for example, a PWR, has a heat exchanger such as a steam generator. Therefore, usually there is a time difference between the peak time of neutron flux data and the peak time of temperature of moderator such as the cooling water. Noting that there is a direct relation between the time difference and the time constant $\tau_{sg,12}$ and that there is a strong correlation between the upper limit reactor power and the maximum temperature of average moderator temperature $T_{c,av}$, the upper limit reactor power and $\tau_{sg,12}$ are determined.

In order to evaluate the difference between peak times of power and temperature measurement values by the least squares fitting method, an error function given by Equation (9) is introduced, using initial power $P_0\{=P(0)\}$ and time constant $\tau_{sg,12}$ related to heat transfer as parameters. In Equation (9), upper suffixes s and m represent analytical value and measured value, respectively.

$$E(\tau_{sg,12}, P_0) = \left(1.0 - \frac{t_p^s}{t_p^m}\right)^2 + \left(1.0 - \frac{\Delta T_{c,av}^s}{\Delta T_{c,av}^m}\right)^2 \quad \text{[Equation 9]}$$

Here, $t_p$ represents maximum temperature time of average moderator temperature $T_{c,av}$, and $\Delta T_{c,av}$ represents temperature variation width when maximum temperature is attained (temperature increase from sub-critical state).

Conditions under which the error function $E(\tau_{sg,12}, P_0)$ attains the minimum, that is, the values of time constant $\tau_{sg,12}$ and the initial power $P_0$ with which the moderator maximum temperature time and the maximum width of increase of average moderator temperature both become equal to the actually measured values, are calculated in the similar manner as the least squares fitting using Equation (1) above. Upper limit reactor power $P_{max}$ is assumed to be the maximum reached reactor power calculated from simulation analysis with $(\tau_{sg,12}, P_0)$ minimizing the error function E. In each iteration process of the least squares fitting, $P_0$ is reevaluated from Equation (3) using $P_{max}$ modified in the respective iterations.

(Determination of Average Fuel Rod Temperature Variation)

Using the maximum reached reactor power $P_{max}$ and the width of reactor power variation $R_{zm}$ determined in the above-described manner, reactor power response from the initial power to the maximum reached reactor power is determined, from the NIS signal with γ-ray noise removed. By inputting the reactor power response and the actually measured average moderator temperature $T_{c,av}$ to the heat transfer equation related to average fuel rod temperature, the average fuel rod temperature variation $\Delta T_{f,av}(t)$ is determined.

(Calculation of Effective Average Fuel Temperature)

Average temperature of fuel increases/decreases in accordance with the reactor power, and the temperature variation is large and rapid as compared with the moderator. Introducing the first-order perturbation theory to examine reactivity response to fuel temperature variation, the average fuel temperature variation $\Delta T_{f,av}(t)$ is given as importance power-averaged value $\Delta T^{l,ip}_{f,av}(t)$ represented by Equation (10) below.

Here, the first-order perturbation theory is used from the following reason: the perturbation theory is to put a small variation and to consider the influence of the variation. In evaluating the influence of variation with the first-order perturbation theory, higher products more than the second between various perturbations induced by the variation are neglected because they are negligible and the influence is evaluated only with the first-order perturbations. It is superior as a method of evaluating correctly reactivity variation by explicitly taking into account the local effect of fuel temperature distribution. Thus, application of perturbation theory is considered appropriate, as the fuel temperature variation is small at the time of reactor physics test.

$$\Delta T^{ip}_{f,av}(t) = \left(\frac{\int_V \phi^\dagger(r) \Delta T_f(r,t) \phi(r) dV}{\int_V \phi^\dagger(r) \phi(r) dV}\right) \quad \text{[Equation 10]}$$

The average fuel temperature variation $\Delta T_{f,av}(t)$ calculated by the one-point reactor kinetic model is a volume-averaged value as represented by Equation (11) below:

$$\Delta T_{f,av} = \left(\frac{\int_V \Delta T_f(r,t) dV}{\int_V dV}\right) \quad \text{[Equation 11]}$$

When operated with rated power, the moderator (cooling water) at an upper part of reactor core is higher in temperature and lower in density than the moderator at a lower part of the core. Therefore, burning does not more proceed at the core upper part than at the lower part. In each fuel cycle, only about one third of fuel assemblies are replaced with fresh ones, while the remaining assemblies are continuously used in the following cycle. When the reactor power is small as in the zero-power test, difference in moderator density is small between the upper and lower parts of the core, while there remains more unburned fuel at the upper part of the core. As a result, neutron flux distribution (φ) is biased to the core upper part, and hence, power distribution, which is approximately in proportion to the neutron flux distribution, is also biased to the core upper part. Accordingly, the fuel (fuel rod) temperature also varies largely at the core upper part. Specifically, at the core upper part, the neutron flux (φ) is larger and the neutron importance distribution ($\phi^T$) is also higher. As a result, importance power-averaging is more highly evaluated than volume-averaged value. Therefore, we define a correction coefficient given by Equation (12), that is derived by using a one-dimensional (flow path direction) kinetic simulation code, considering space-dependency of neutron flux distribution φ(r) (including adjoint neutron flux distribution $\phi^t(r)$), and fuel temperature distribution S(r) normalized as $\int_r S(r) dr = 1$) in the coolant (moderator) flow direction. The importance power-averaged fuel temperature is obtained from the volume-averaged value by multiplying the correction coefficient $c^{ip}$.

$$c^{ip} = \frac{\Delta T^{ip}_{f,av}}{\Delta T_{f,av}} \quad \text{[Equation 12]}$$

(Calculation of Doppler Reactivity Coefficient)

Equation (13) represents the error function defined from Doppler reactivity coefficient. The Doppler reactivity coefficient $\alpha_f$ that minimizes the error function is the measured Doppler reactivity coefficient.

$$E_{rdf} = \frac{1}{N} \sum_{i=1}^{N} \left\{ 1.0 - \frac{\alpha_f(c^{ip}\Delta T_{f,av}(t_i) - \Delta T_{c,av}(t_i)))}{\Delta \rho_{fc}(t_i)} \right\}^2 \quad \text{[Equation 13]}$$

For evaluating the error function, values measured in a time period from reactivity addition by withdrawing control rod bank to the upper limit reactor power are used. However, the data in about 100 seconds after the withdrawal of control rod to add the initial reactivity $\rho_{in}$ and in several tens seconds after range switching of neutron flux measurement may be omitted.

In the following, inventions as recited in each of the claims will be described.

The invention as recited in claim 1 provides a method of measuring Doppler reactivity coefficient, comprising:

the step of measuring neutron flux in which reactor power is increased by a prescribed amount with which the temperature reactivity effect is sufficiently large to observe it clearly in reactivity transient period by applying reactivity to a reactor core, and neutron flux during this period is measured as time-series data;

the step of obtaining time-series data of in-reactor average moderator temperature in which reactor power is increased by a prescribed amount by applying reactivity to a reactor core, and average moderator temperature in the reactor during this period is obtained as time-series data by a prescribed procedure;

the step of obtaining time-series data of reactivity in which the time-series data of reactivity is obtained from the measured time-series data of neutron flux, using inverse kinetic method to one-point reactor kinetic equation;

the step of obtaining time-series data of reactor power in which, based on said obtained time-series data of in-reactor average moderator temperature and the time-series data of neutron flux, the time-series data of reactor power matching said two time-series data with numerically evaluated time-series data by a prescribed procedure is obtained, the step of obtaining time-series data of fuel temperature in which the time-series data of fuel temperature subjected to prescribed averaging, obtained by using the time-series data of reactor power and a prescribed kinetic model;

the step of obtaining reactivity feedback contribution component in which the reactivity feedback contribution component is obtained using the time-series data of reactivity and the obtained reactivity of constant reactor period; and the step of obtaining Doppler reactivity coefficient, in which the Doppler reactivity coefficient is obtained by a prescribed procedure, using the time-series data of in-reactor average moderator temperature, the time-series data of fuel temperature subjected to prescribed averaging, an isothermal temperature reactivity coefficient, and the reactivity feedback contribution component.

The present invention enables measurement of Doppler reactivity coefficient of a nuclear reactor, which is easy and applicable to discontinuous data.

Further, the prescribed amount of "reactor power is increased by a prescribed amount in which the reactor power is increased in a constant reactor period in a low power range and subsequently the increasing rate is gradually decreased due to temperature reactivity feedback compensation effect. The actual amount, however, is within 1% of the rated power, since the measurement is done during nuclear reactor physics test, and with this small reactor power change, the variation of various physical constants, such as heat capacities and densities of moderator and fuel affecting reactor dynamics, induced by temperature increase remain almost unchanged, i.e., constant during the measurement.

Further, "time-series data" refers to data measured as the time passes from the start until a prescribed amount of power is reached. The data, however, need not be the data covering the entire period of time. Non-preferable data, for example, of about 30 seconds after range switching of neutron flux measurement and up to 100 seconds after moving the control rod bank may be excluded. As to the sampling interval, though sampling at an interval of 0.001 second is desirable considering the trade-off between accuracy of analysis and amount of data computation, it is not limiting, and analogue data is not excluded, either.

Further, the "prescribed procedure" in the "step of obtaining time-series data of in-reactor average moderator temperature" refers to a procedure of obtaining an average value (result) of measurement values of temperature sensors provided at reactor outlet side cooling pipe and reactor inlet side cooling pipe, respectively, by passing the measurement values through an averaging circuit.

Further, the "prescribed kinetic model" in the "step of obtaining time-series data of reactor power" refers to the commonly used one-point reactor kinetic model or core analysis code.

Further, as the "fuel temperature subjected to prescribed averaging," a value obtained based on the first-order perturbation theory or other analysis, an experimental value or the like is used.

Further, the "prescribed averaging" may be, for example, "importance-averaging."

Further, the "isothermal temperature reactivity coefficient" refers to a sum of the reactivity coefficient of fuel temperature only (obtained by partial differentiation by fuel temperature) and reactivity coefficient of moderator temperature only (obtained by partial differentiation by moderator temperature).

The invention as recited in claim 2 is the method of measuring Doppler reactivity coefficient described above, wherein measurement of the time-series data of neutron flux at said step of measuring neutron flux measures neutron flux as well as γ-ray; and said step of obtaining time-series data of reactivity has a removal procedure of removing influence of the γ-ray from the measured time-series data of neutron flux, and, from the time-series data with the influence of γ-ray removed, time-series data of reactivity is obtained using inverse kinetic method to the one-point reactor kinetic equation.

By the invention as recited in this claim, it becomes easier to accurately measure neutron flux in a lower reactor power stage, using a simple measurement device such as an ionization chamber, in a currently operating PWR.

The invention as recited in claim 3 is the method of measuring Doppler reactivity coefficient according to claim 2, wherein, in said removal procedure, (1) an error function is evaluated by the least squares method, wherein 1) the error function is defined by using a) a time-change numerically evaluated value calculated by a prescribed nuclear reactor kinetic equation using the reactivity of constant reactor period and γ-ray mixture rate as parameters related to reactor power response in a low power range in which reactivity feedback contribution is negligible, and b) a time-change part corresponding to the reactor power response of actually measured time-series data of neutron flux, and 2) the error function represents difference between these two in logarithmic value; and (2) a combination of the reactivity of constant reactor period and the γ-ray mixture rate that minimizes the error function value is obtained. The γ-ray mixture rate forming the combination is regarded as true γ-ray mixture rate.

In the invention according to this claim, the γ-ray mixture rate that minimizes the error function related to the difference between the numerical evaluated value and the actually measured value of reactor power closely related to the neutron flux is used and, therefore, accurate γ-ray mixture rate and hence, true reactor power, can be obtained.

Here, "time-series data in a low power range in which reactivity feedback contribution is small" refers to time-series data of power within 1% of rated power, and the reason why the data in such a range is used is that the γ-ray mixture rate can be obtained accurately without necessitating correction of the influence of reactivity feedback.

The invention as recited in claim 4 is the method of measuring Doppler reactivity coefficient described above, wherein at said step of obtaining in-reactor average moderator temperature, the average moderator temperature is obtained in the form of time-series data, when the reactor power is increased by a prescribed amount by applying reactivity to a reactor core in a close-to-critical state.

In the invention according to this claim, process proceeds in accordance with a prescribed procedure using, for example, moderator (cooling water) temperatures at the inlet and outlet of a steam generator and the heat input from a moderator circulation pump as data for calculation, and as a result, time-series data of the moderator temperature in the reactor matched in time with the time-series data of neutron flux is obtained. Therefore, it becomes possible to determine the actual reactor power using time-series data of quantities measured in a conventional test process of the zero power reactor physics test, that is, detector current of ex-core neutron detector and the average moderator temperature. This also enables direct measurement of Doppler reactivity coefficient with standard instrumentation devices in the conventional testing procedure.

It is noted that heat radiation from a coolant pipe, for example, may not be excluded for consideration "as data" mentioned above.

Further, other temperature or temperatures such as inlet (low) and outlet (high) temperatures of the moderator in the reactor may be obtained.

The invention as recited in claim 5 is the method of measuring Doppler reactivity coefficient described above, wherein in said prescribed procedure at said step of obtaining time-series data of reactor power, a time constant related to heat transfer from primary side to secondary side of the steam generator and an initial reactor power are selected as parameters, and a combination of said time constant and the initial reactor power that minimizes the value of the error function represented by {1−(numerically evaluated time of average moderator temperature to maximum temperature/measured time of average moderator temperature to maximum temperature)}$^2$+{1−(numerically evaluated value of maximum change width of average moderator temperature/measured value of maximum change width of average moderator temperature)}$^2$ is obtained.

In the invention according to this claim, the combination of time constant and reactor power that minimizes the error function value is searched for, and based on the result of search, optimal time constant and upper limit reactor power are obtained. Therefore, evaluation of the in-reactor average moderator temperature according to the invention of claim 4 can be made accurate.

Further, as the absolute value of upper limit power and the power variation width from the initial power to the upper limit attained power can be determined, it is possible to obtain the reactor power response represented in an absolute value from the NIS signal with γ-ray removed. Further, from the obtained reactor power response and the actually measured moderator temperature, it is possible to obtain accurate time-series data of average fuel rod temperature.

The invention as recited in claim 6 is the method of measuring Doppler reactivity coefficient described above, wherein at said step of obtaining time-series data of fuel temperature, volume-averaged fuel temperature calculated by using a heat conduction equation related to average fuel rod temperature and time-series data of reactor power is modified by using a correction coefficient obtained in consideration of distributions of neutron flux and adjoint neutron flux (neutron importance) in a moderator flow path direction in zero-power state, whereby time-series data of fuel temperature subjected to prescribed averaging, based on the first-order perturbation theory, is obtained.

Therefore, evaluation of fuel temperature becomes accurate.

The invention as recited in claim 7 is the method of measuring Doppler reactivity coefficient described above, wherein said prescribed averaging is importance power averaging, and in the prescribed procedure at said step of obtaining Doppler reactivity coefficient, the following equation is used: "reactivity feedback contribution component related to Doppler reactivity coefficient=Doppler reactivity coefficient× (change amount of fuel temperature obtained by using time-series data of importance power-averaged fuel amount of average in-reactor moderator temperature)+isothermal temperature reactivity coefficient×change amount of average in-reactor moderator temperature."

In the invention according to this claim, since an accurate equation is used, an accurate estimation of Doppler reactivity coefficient can be made.

Here, "importance power averaging" refers to weight average by neutron importance distribution and neutron flux distribution, assuming that reactivity changes with fuel temperature variation based on the first perturbation theory.

The invention as recited in claim 8 is the method of measuring Doppler reactivity coefficient described above, wherein further in the prescribed procedure at said step of obtaining Doppler reactivity coefficient, a Doppler reactivity coefficient is selected as a parameter, and a Doppler reactivity coefficient that minimizes the value of an error function is estimated as the actual Doppler reactivity coefficient, wherein the error function is defined as {1.0−Doppler reactivity coefficient×(change amount of fuel temperature obtained by using time-series data of importance power-averaged fuel amount of average in-reactor moderator temperature)/reactivity contribution component related to Doppler reactivity coefficient}$^2$ based on the obtained data.

In the invention according to this claim, Doppler reactivity coefficient is used as a parameter and the Doppler reactivity coefficient that minimizes the error function is obtained. Therefore, thus obtained Doppler reactivity coefficient has high accuracy.

Effects of the Invention

The present invention enables measurement of Doppler reactivity coefficient of a nuclear reactor which is easy and applicable to discontinuous data.

DESCRIPTION OF THE REFERENCE SIGNS

| 10 | reactor core |
| 11 | ionization chamber |
| 12 | ionization chamber |
| 20 | steam generator |
| 21 | temperature sensor |
| 22 | temperature sensor |
| 30 | cooling water circulation pump |
| 31 | ampere meter |
| 41 | nuclear reactor outlet side pipe |
| 42 | nuclear reactor inlet side pipe |
| 50 | minute electric current meter |
| 51 | DC amplifier |
| 52 | terminal base |
| 53 | A/D converter board (note PC) |

BEST MODES FOR CARRYING OUT THE INVENTION

In the following, the present invention will be described based on a best mode thereof. It is noted that the present invention is not limited to the embodiment below. Various modifications may be made on the following embodiment, within the same and equivalent scope of the present invention.

In the present embodiment, data obtained by actual measurement of existing PWR are processed, to measure the Doppler reactivity coefficient of the nuclear reactor.

(Analysis System)

The reactor core characteristics are analyzed using one-point reactor kinetic simulation model and one-dimensional (in the direction of cooling water flow) kinetic simulation model and, for the analysis, radial power distribution of reactor core is assumed to be flat, as fuel assemblies are loaded so as to be flat distribution.

(Measurement System)

Figure 2:
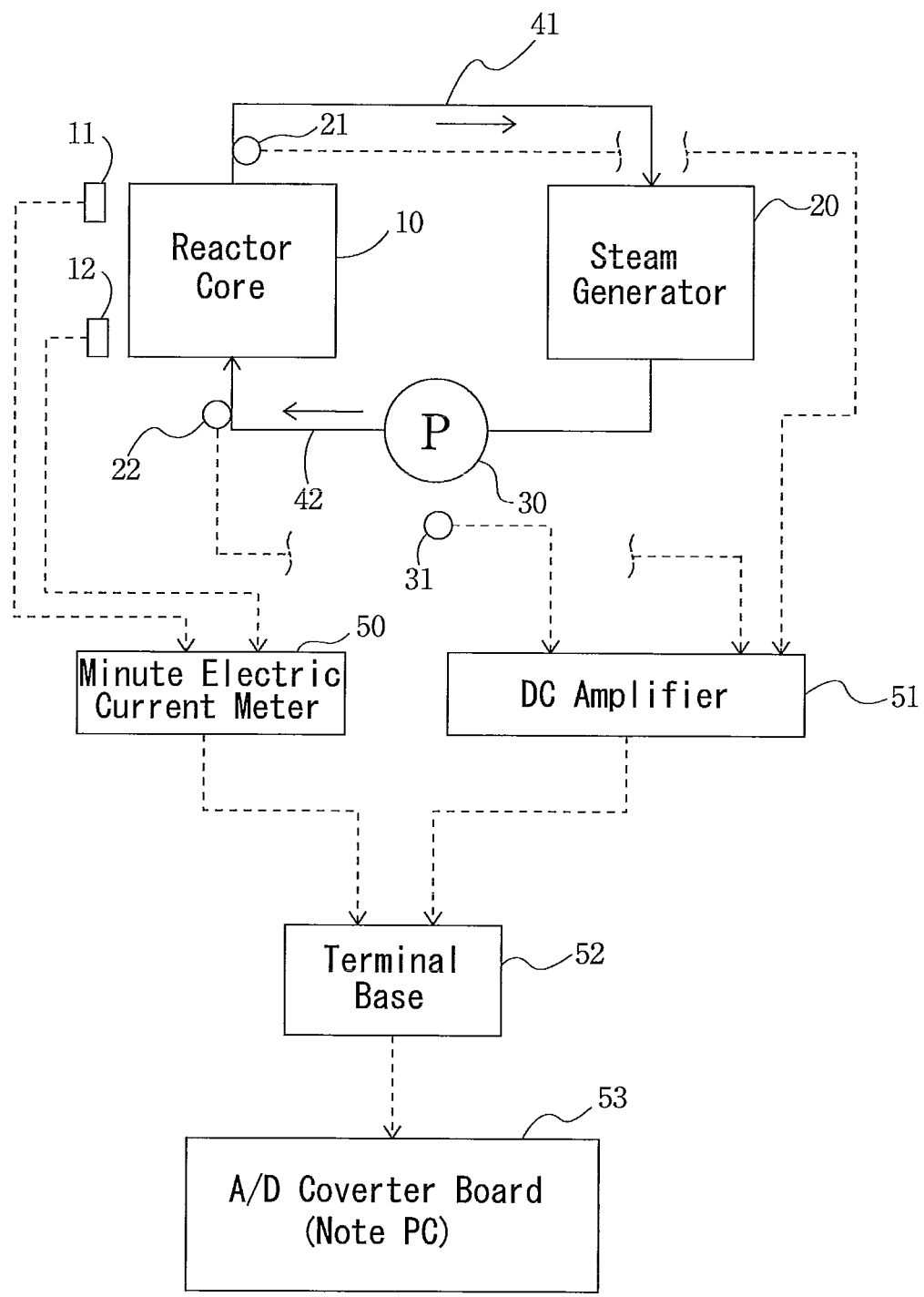
FIG. 2 A schematic illustration of the measuring system.

FIG. 2 schematically shows the measurement system including device configurations in accordance with the present embodiment. Referring to FIG. 2, Reference Characters 11 and 12 denote ionization chambers for ex-core neutron flux detection; 21 and 22 temperature sensors such as resistance temperature detector (RTD); 31 a current meter; 50 a minute ampere meter; 51 a DC amplifier; 52 a terminal base; and 53 an A/D conversion board (note PC).

Dotted lines represent signal lines for measurement.

The AD converter had the resolution of −10 to +10V/16 bit.

Data sampling time interval was 0.001 second and the time of measurement was 2600 seconds.

In addition to the above, a low-pass filter, an amplifier and the like are also used.

(Selection of Measurement Data)

Up to 100 seconds after movement of the control rod bank, spatial variation in power distribution occurs because of the movement of control rods, which has influence on the NIS signal. Therefore, response in the time domain having such influence is excluded from the object of fitting (analysis).

As the reactor power is increased from an initial power state up to about 200 times, the measurement range of NIS (number of figures as the object of measurement) must be switched. The measurement is influenced for about 30 seconds after the switching and, therefore, this time period is excluded from the object of fitting.

Data before the peak at which the upper limit value is recognized, where operational environment of steam generator secondary system is considered relatively stable, were used.

(Measured Time-Series Data)

Control rods were operated so that the PWR, which was initially sub-critical, achieved critical and the power was further increased until a sufficiently large temperature reactivity compensation effect is observed in reactor transient, while the neutron flux and moderator temperature were measured.

Figure 3:
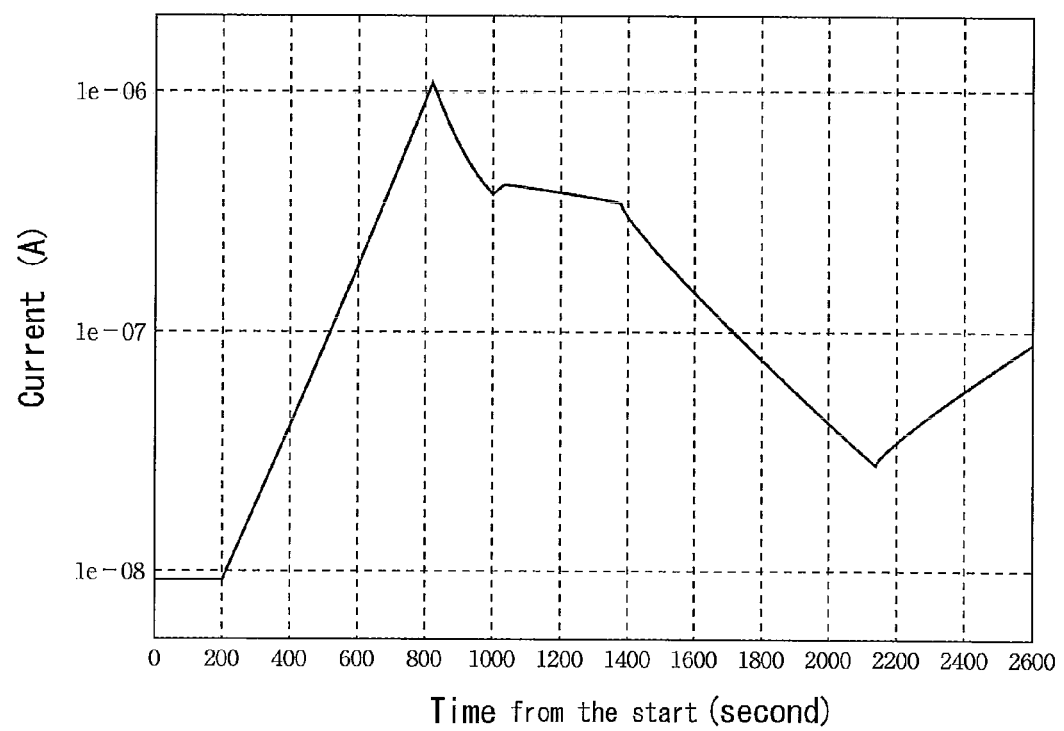
FIG. 3 A graph showing actually measured time-series data of neutron flux.

FIG. 3 shows time-series data of neutron flux obtained by actual measurement. In FIG. 3, the ordinate represents neutron flux converted to current (A), and the abscissa represents time passed from the start of data acquisition. In graphs showing time-series data of physical amounts discussed later, the ordinate represents physical amount and the abscissa represents time passed from the start of data acquisition, as above.

Figure 4:
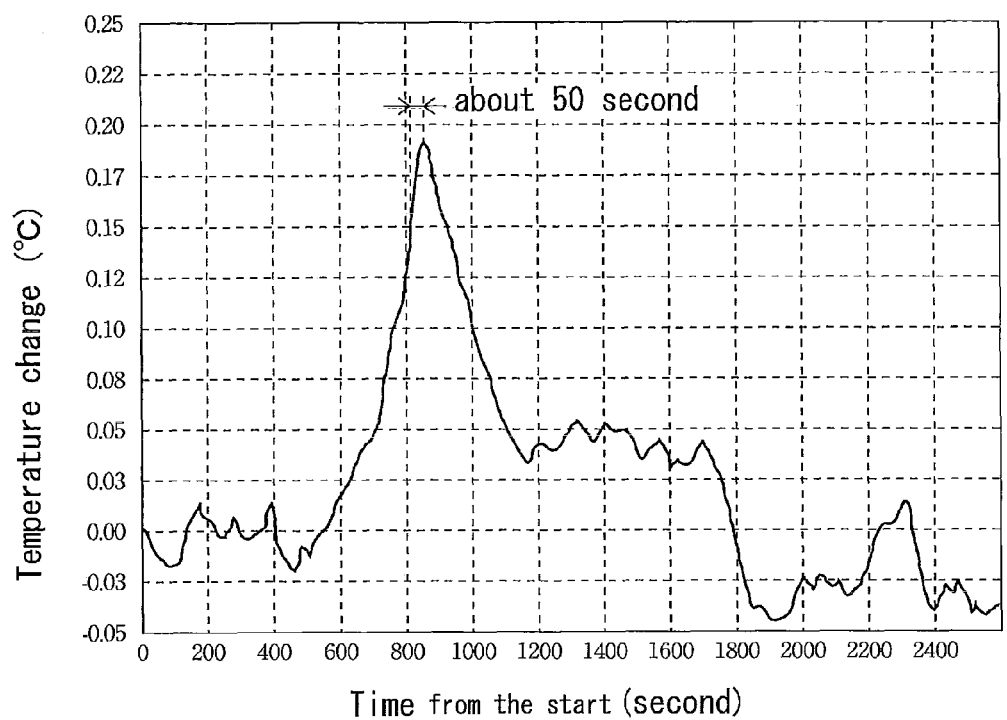
FIG. 4 A graph showing actually measured time-series data of average moderator temperature.

FIG. 4 also shows time-series data of average moderator temperature. As compared with FIG. 3, it can be seen that there is a delay of about 50 seconds between the maximum value peaks. It was found from theoretical analysis that the time delay results from heat removing characteristics of steam generator, which is dominantly influenced by a time constant $\tau_{sg,12}$ related to heat transfer (heat transmission) from the primary side to the secondary side of the steam generator, and that the larger the constant $\tau_{sg,12}$, the larger the delay. Further, $\tau_{sg,12}$ was found to be about 34 seconds.

(Removal of γ-Ray)

Figure 5:
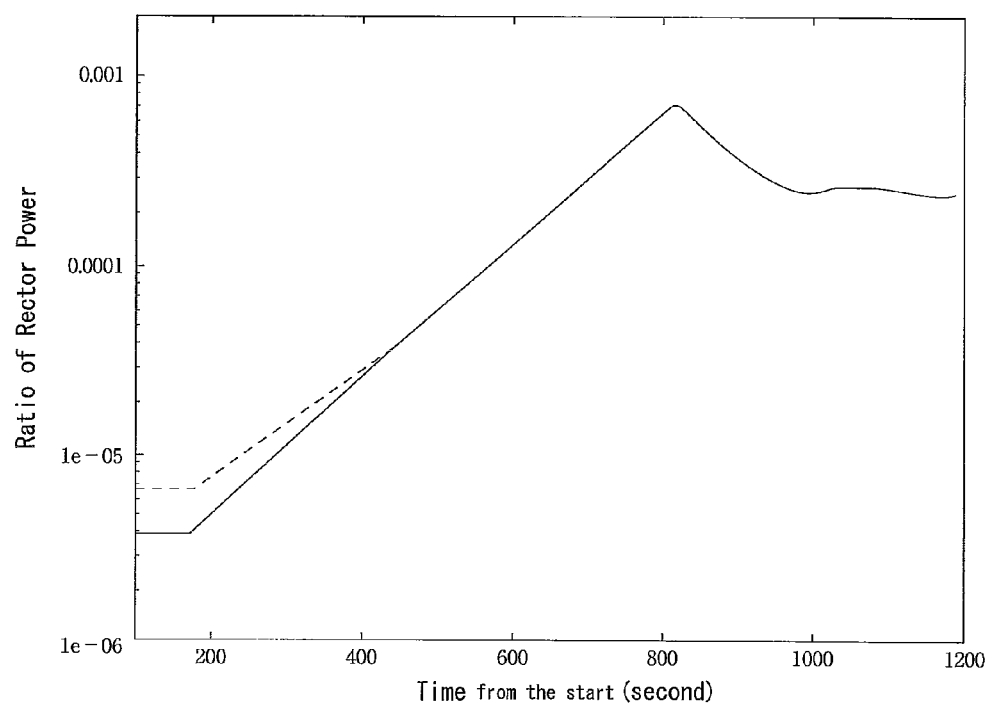
FIG. 5 A graph showing time-series data of power before and after γ-ray removal.

From the obtained neutron flux data, numerical values of γ-ray mixture rate $g_c$=0.78 and reactivity of constant reactor period $\rho_p$=46.6 pcm were calculated from the least squares fitting using Equation (1). FIG. 5 shows time-series data of power calculated from Equation (2) using the calculated γ-ray mixture rate $g_c$. In FIG. 5, the ordinate represents the ratio of reactor power P to rated power, the solid line represents time-series data of reactor power P obtained based on the neutron flux after γ-ray removal, and the dotted line represents time-series data of reactor power obtained based on the neutron flux before γ-ray removal. It is noted that the dotted line is basically the same as the data of FIG. 3 represented in detector current value.

It can be seen from FIG. 5 that in a range where reactor power P is small, the influence of γ-ray appears significantly.

Further, the width of reactor power variation was about 220 times.

Figure 6:
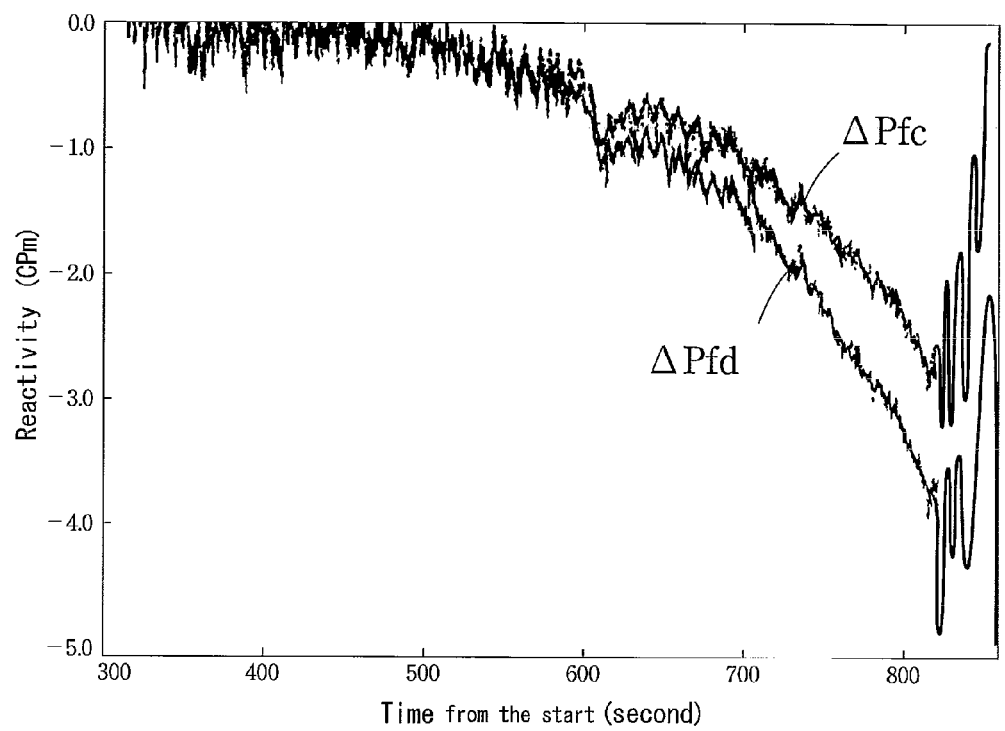
FIG. 6 A graph showing time-series data of two reactivity feedback contribution components.

Two reactivity feedback contribution components calculated from Equations (4) and (6) corresponding to the time-series data of reactor power P shown in FIG. 5 are shown. Around 600 to 800 seconds of FIG. 6, the upper line shows the feedback contribution component $\Delta\rho_{fc}$ related to Doppler reactivity coefficient, and the lower line shows the overall reactivity feedback effect, $\Delta\rho_{in}$, induced by Doppler and moderator reactivity feedback.

(Determination of Upper Limit Attained Reactor Power)

Figure 1:
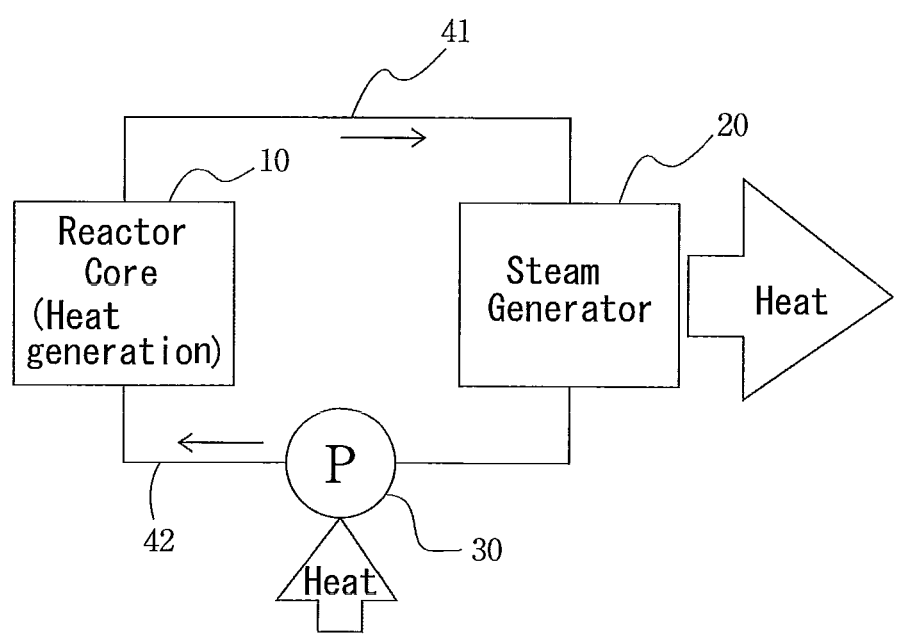
FIG. 1 A schematic illustration of heat balance in the primary coolant loop of PWR.
Figure 7:
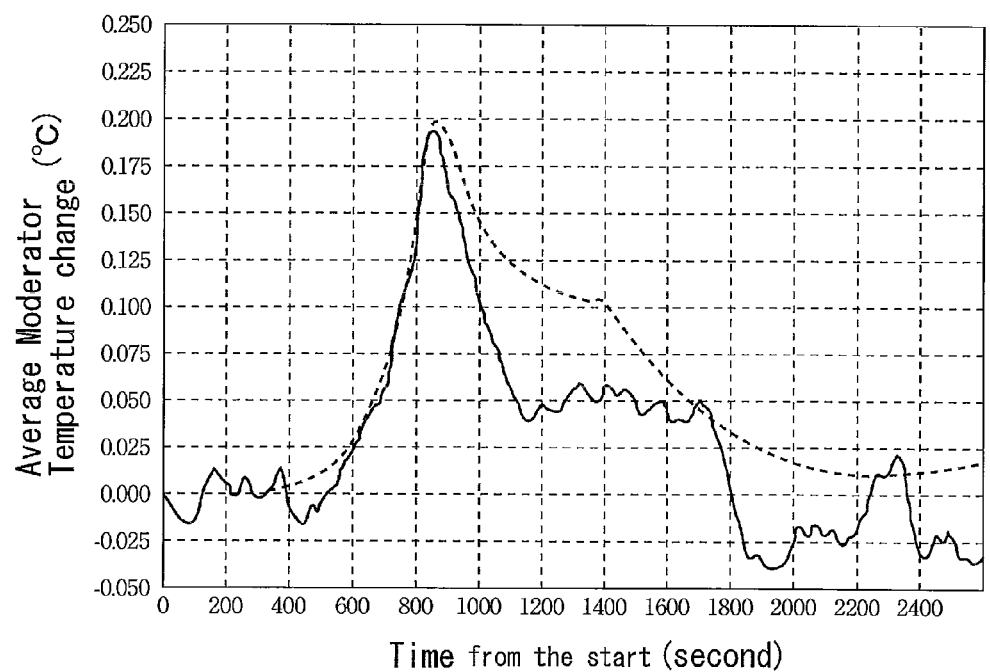
FIG. 7 A graph showing time-change of average moderator temperature.

By the method described in the section of (Primary Cooling Loop Heat Removal Model) above applied to the model shown in FIG. 1 as an object, it was found that $\tau_{sg,12}$=34 s, and $P_0 = 3.77 \times 10^{-4}$%/rated power, and hence upper limit reactor power $P_{max} = 8.35 \times 10^{-2}$%/rated power. Further, time-series data of average moderator temperature $\Delta T_{c,av}$ numerically evaluated using reactor kinetics simulation model using these values was obtained as shown in FIG. 7. In FIG. 7, the solid line represents the calculated value, and the dotted line is the measured value. In the response before the peak time as the object of fitting, no difference is recognized between the measured value and the calculated value including the peak time and the peak value.

(Calculation of Average Fuel Temperature)

From the neutron flux distribution and neutron importance distribution calculated evaluated with one-dimensional (flow path direction) kinetics simulation model, the correction coefficient value $c^{ip}$ for converting the volume-averaged fuel temperature to importance-averaged fuel temperature was calculated using Equation (12), of which result was 1.296. Though high-speed group neutron flux was used as the Doppler reactivity feedback effect is of interest, the results were not different when thermal neutrons were used. Further, using this value, importance-averaged fuel temperature was calculated.

(Estimation of Doppler Reactivity Coefficient)

From Equation (13), Doppler reactivity coefficient $\alpha_f$ that minimizes the error function was estimated, and the result was $\alpha_f = -3.2$ [pcm/K], which was the same as the design value to two significant figures.

What is claimed is:

1. A method of measuring Doppler reactivity coefficient, comprising:

measuring time-series data of neutron flux in which reactor power is increased by a prescribed amount by applying reactivity to a reactor core which is in sub-critical or achieves super critical, and obtaining time-series data of in-reactor average moderator temperature in which reactor power is increased by the prescribed amount by applying reactivity to the reactor core which is in sub-critical or achieves super critical, wherein in said measuring step, neutron flux during this period is measured as time-series data, and in said step of obtaining time-series data of in-reactor average moderator temperature, average moderator temperature in the reactor is obtained as time-series data;

obtaining time-series data of reactivity in which the time-series data of reactivity is obtained from the measured time-series data of neutron flux, said time-series data of reactivity being calculated by applying an inverse kinetic method based on a one-point reactor kinetic equation;

obtaining time-series data of reactor power by calculating the time-series data of reactor power based on said obtained time-series data of in-reactor average moderator temperature and the time-series data of neutron flux, such that the obtained time-series data of reactor power matches said two time-series data which are the time-series data of in-reactor average moderator temperature and the time-series data of neutron flux, obtaining time-series data of fuel temperature in which the time-series data of fuel temperature subjected to a prescribed averaging is obtained from the time-series data of reactor power obtained above and a reactor kinetic model;

obtaining time-series data of reactivity feedback contribution component in which the time-series data of reactivity feedback contribution component is calculated from the time-series data of reactivity obtained above in said step of obtaining time-series data of reactivity, and the reactivity of constant reactor period; and obtaining Doppler reactivity coefficient, in which the Doppler reactivity coefficient is obtained from the obtained time-series data of in-reactor average moderator temperature, the obtained time-series data of fuel temperature subjected to said prescribed averaging, an isothermal temperature reactivity coefficient, and the obtained time-series data of reactivity feedback contribution component.

2. The method of measuring Doppler reactivity coefficient according to claim 1, wherein measurement of the time-series data of neutron flux at said step of measuring neutron flux measures neutron flux as well as γ-ray; and said step of obtaining time-series data of reactivity has a removal procedure of removing influence of the γ-ray from the measured time-series data of neutron flux, and, from the time-series data with the influence of γ-ray removed, time-series data of reactivity is obtained from said inverse kinetic method with respect to the one-point reactor kinetic equation.

3. The method of measuring Doppler reactivity coefficient according to claim 2, wherein, in said removal procedure, an error function is evaluated by the least squares method in the following way:

the error function is defined from a time-change numerically evaluated value calculated by a nuclear reactor kinetic equation based on a reactivity of constant reactor period and a γ-ray mixture rate as parameters related to reactor power response in a low power range in which reactivity feedback contribution is negligible, and a time-change part corresponding to the reactor power response of actually measured time-series data of neutron flux, the error function being calculated as a difference between these two in logarithmic value; and a combination of the reactivity of constant reactor period and the γ-ray mixture rate that minimizes the error function value is aimed.

4. The method of measuring Doppler reactivity coefficient according to any one of claims 1-3, wherein at said step of obtaining time-series data of in-reactor average moderator temperature, the average moderator temperature is obtained in the form of time-series data, when the reactor power is increased by a prescribed amount by applying reactivity to a reactor core which is in sub-critical or achieves super critical.

5. The method of measuring Doppler reactivity coefficient according to claim 4, wherein at said step of obtaining time-series data of reactor power, a time constant $\tau_{sg,12}$ related to heat transfer from a primary side to a secondary side of a steam generator associated with the reactor, and an initial reactor power $P_0$ are selected as parameters, and a combination of said time constant $\tau_{sg,12}$ and the initial reactor power $P_0$ is obtained that minimizes the value of the error function $E(\tau_{sg,12}, P_O)$ represented by:

$$E(\tau_{sg,12}, P_0) = \left(1.0 - \frac{t_p^s}{t_p^m}\right)^2 + \left(1.0 - \frac{\Delta T_{c,av}^s}{\Delta T_{c,av}^m}\right)^2$$

wherein $t_p^s$ represents analytical time of average moderator temperature to maximum, $t_p^m$ represents measured time of average moderator temperature to maximum temperature, $\Delta T_{c,av}^s$ represents analytical value of maximum change width of average moderator temperature, and $\Delta T_{c,av}^m$ represents measured value of maximum change width of average moderator temperature.

6. The method of measuring Doppler reactivity coefficient according to claim 1, wherein
at said step of obtaining time-series data of fuel temperature, volume-averaged fuel temperature is numerically evaluated from a fuel rod heat conduction equation related to average fuel rod temperature, and time-series data of reactor power is modified based on a correction coefficient obtained in consideration of distributions of neutron flux and adjoint neutron flux (neutron importance) in a moderator flow path direction in zero-power state,
such that time-series data of fuel temperature subjected to prescribed averaging, based on the first-order perturbation theory, is obtained.

7. The method of measuring Doppler reactivity coefficient according to claim 1, wherein
said prescribed averaging is importance power averaging in said step of obtaining time-series data of fuel temperature,
wherein said time-series data of fuel temperature is used for obtaining the Doppler reactivity coefficient $\alpha_f$ such that:
in said step of obtaining Doppler reactivity coefficient, the Doppler reactivity coefficient $\alpha_f$ is obtained from the following equation:

$\Delta\rho_{fd}(t) = \alpha_f(\beta T_{f,av}(t) - \Delta T_{c,av}(t)) + \alpha_{itc}\Delta T_{c,av}(t)$ wherein in said equation $\Delta\rho_{fd}(t)$ represents a reactivity feedback contribution component related to Doppler reactivity feedback, $\alpha_f$ represents a Doppler reactivity coefficient, $\Delta T_{f,av}(t)$ represents a change amount of average fuel rod temperature, $\Delta T_{c,av}(t)$ represents change amount of average moderator temperature, and $\alpha_{itc}$ represents an isothermal temperature reactivity coefficient.

8. The method of measuring Doppler reactivity coefficient according to claim 7, wherein
in said step of obtaining Doppler reactivity coefficient based on the equation of claim 7, the actual Doppler reactivity coefficient $\alpha_f$ is estimated as the coefficient that minimizes the value of an error function $E_{rdf}$ which is defined as:

$$E_{rdf} = \frac{1}{N} \sum_{i=1}^{N} \left\{ 1.0 - \frac{\alpha_f(c^{ip}\Delta T_{f,av}(t_i) - \Delta T_{c,av}(t_i))}{\Delta\rho_{fc}(t_i)} \right\}^2$$

wherein N represents the number of data, $t_i$ represents time corresponding to data i, $\Delta\rho_{fc}(t)$ represents a reactivity contribution component, and $c^{ip}$ represents a correction coefficient defined as:

$$c^{ip} = \frac{\Delta T_{f,av}^{ip}}{\Delta T_{f,av}}$$

wherein $\Delta T^{ip}_{f,av}(t)$ represents a change amount of importance power-averaged value of fuel temperature, and
wherein $\Delta T_{f,av}(t)$ represents a change amount of average fuel rod temperature, and $\Delta T_{c,av}(t)$ represents a change amount of average moderator temperature as recited in claim 7.

* * * * *